Jan. 9, 1962  J. O. HELVERN  3,016,112
BRAKE ANCHOR PIN
Filed Sept. 17, 1959  3 Sheets-Sheet 1

INVENTOR.
James O. Helvern
BY
His Attorney

Jan. 9, 1962 J. O. HELVERN 3,016,112
BRAKE ANCHOR PIN
Filed Sept. 17, 1959 3 Sheets-Sheet 2

INVENTOR.
James O. Helvern
BY
His Attorney

Jan. 9, 1962 J. O. HELVERN 3,016,112
BRAKE ANCHOR PIN
Filed Sept. 17, 1959 3 Sheets-Sheet 3

INVENTOR.
James O. Helvern
BY
His Attorney

3,016,112
BRAKE ANCHOR PIN

James O. Helvern, Lewisburg, Ohio, assignor to General Motors Corporation, Detroit, Mich., a corporation of Delaware Filed Sept. 17, 1959, Ser. No. 840,714
5 Claims. (Cl. 188—78)

This invention relates to a vehicle drum brake and more particularly to a hollow anchor means in a vehicle drum brake.

In the conventional vehicle drum brake the wheel cylinder and anchor pin may be fastened to the backing plate. The anchor pin may also be fastened to an embossment on the steering knuckle to provide a more rigid anchor for absorbing the brake torque. A tangential extending flange from the wheel cylinder provides a fastening means for the wheel cylinder on the anchor pin. This type of construction, however, requires individual assembling and disassembling of the brake shoes, the wheel cylinder, the anchor means, and the backing plate. Accordingly, this invention relates to a means for permitting the assembling of the backing plate with the brake shoes, the wheel cylinder and anchor pin as a subassembly and then mounting on the steering knuckle. This amounts to a substantial savings in time and cost in manufacture of a unit of this type.

It is an object of this invention to provide a vehicle drum brake with a hollow anchor means.

It is another object of this invention to provide in a vehicle drum brake a hollow anchor member with a fastening means extending through the anchor member to fasten the anchor member rigidly to the steering knuckle.

It is a further object of this invention to provide in a vehicle drum brake a means for assembling and disassembling the backing plate, brake shoes, the actuating means and the anchor member as a unit on the steering knuckle. A fastening means extends through the hollow anchor member fastening the subassembly on the steering knuckle as a unit.

The objects of this invention are accomplished by providing a backing plate, the brake shoes, the hydraulic actuating means, and the hollow anchor member assembled with the retraction springs as a subassembly. This subassembly is then placed on the steering knuckle in its operating position and a bolt is inserted through the hollow anchor member to rigidly fasten the subassembly to the steering knuckle.

The hydraulic cylinder in one version of this invention has a tangential extending flange with a perforation for reception of a bolt which automatically fastens the hydraulic wheel cylinder between the hollow anchor member and the backing plate when the bolt is fastened in the steering knuckle. This assembly provides a considerable savings in time in the assembling of the component parts of the vehicle drum brake. It also provides a convenient means for disassembling the brake in event repair is necessary.

Further objects and advantages of the present invention will be apparent from the following description, reference being had to the accompanying drawings wherein preferred embodiments of the present invention are clearly shown.

Figure 1:
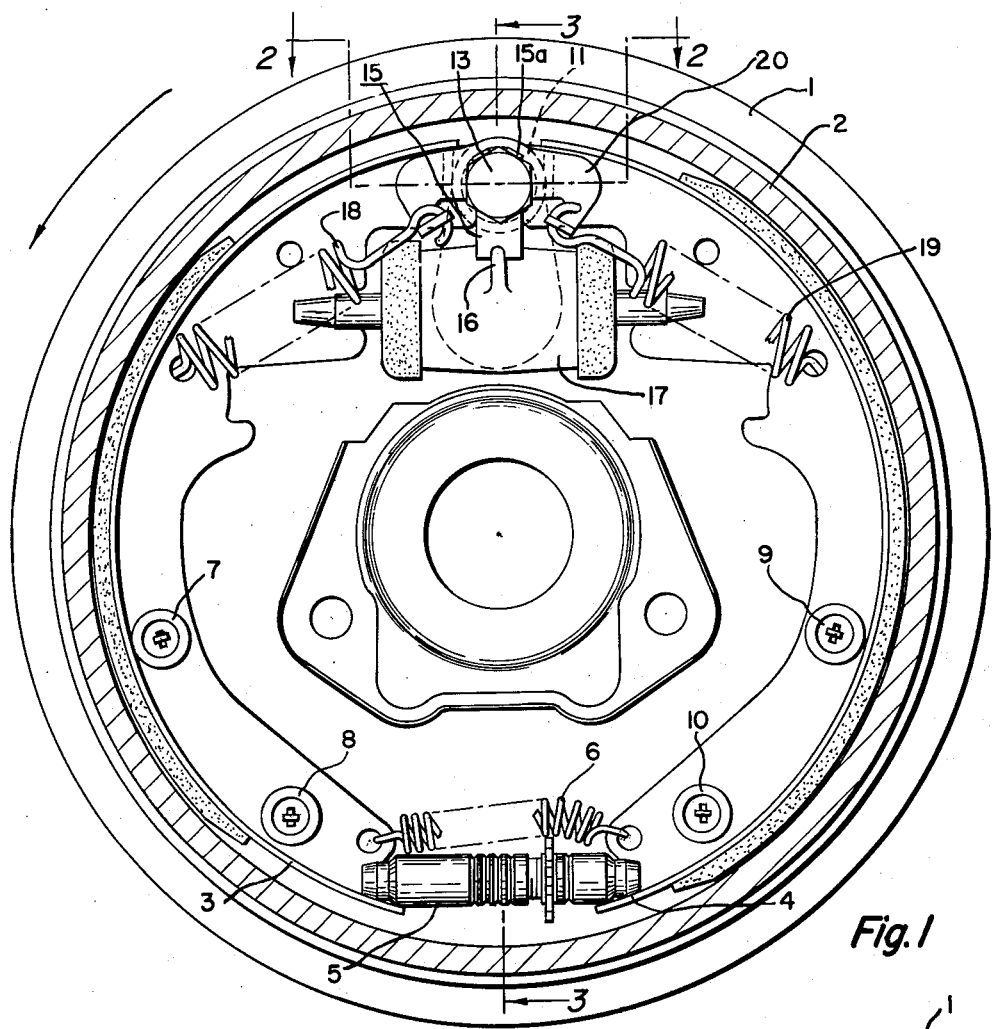
FIGURE 1 is a view wherein the drum is shown in cross section and the relative positions of the various parts of the vehicle drum brake are shown.

The vehicle drum brake as illustrated in this invention provides for the mounting of the hydraulic wheel cylinder and the anchor means on the steering knuckle. FIGURE 1 illustrates the relative position of the various parts in the drum brake. The backing plate 1 is mounted adjacent to and concentric with the brake drum 2. A pair of brake shoes 3 and 4 are mounted for engagement with the inner periphery of the brake drum 2. An adjustable strut 5 is mounted between the two cooperative adjacent ends of the brake shoes 3 and 4. A coil spring 6 is connected to the said two cooperative adjacent ends of the brake shoes as the adjustable strut to maintain contact between the brake shoes and the adjustable strut. The brake shoe 3 is resiliently aligned in its position relative to the backing plate by the hold down pin and spring assemblies 7 and 8. Similar hold down pin and spring assemblies 9 and 10 are provided to resiliently align the brake shoe 4. The opposite two cooperative adjacent ends of the brake shoes engage the hollow anchor pin 11 which extends through the backing plate 2. The hollow anchor pin 11 is staked to the backing plate 1 by forcing a portion 91 of the backing plate into the annular groove 90 of the anchor pin 11. The anchor pin 11 could be assembled to the backing plate by a force fit instead of staking means. The applicant does not wish to limit the invention to one method of fastening. The hollow anchor pin 11 is fastened to an embossment 12 by means of a bolt 13 extending through the central opening 14 in the hollow anchor pin 11. The bolt 13 is held in a non-rotative position by a locking washer 15 which is held in a non-rotative position by the tab 16 on the wheel cylinder 17. The bolt 13 extends through a perforation in the washer 15. After the bolt 13 is tightened within the assembly the tabs 15a are bent against the flat portion of the hexagonal head of the bolt 13 to prevent loosening of the bolt.

The retraction springs 18 and 19 are connected to their respective shoes 3 and 4. The upper ends of the retraction springs 18 and 19 are fastened to their corresponding tabs on the anchor plate 20.

Figure 2:
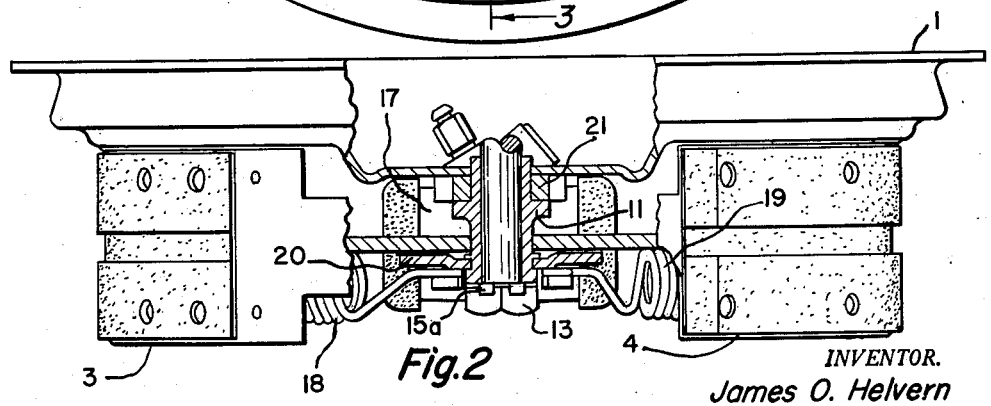
FIGURE 2 is a cross section view taken on line 2—2 of FIGURE 1.

FIGURE 2 illustrates a cross section view through the anchor pin and shows the various parts which are connected to the anchor pin. The wheel cylinder 17 has a tangential extending flange 21 which has a perforation 22 for the reception of a hollow anchor pin 11 and the bolt 13. The wheel cylinder 17 has a protrusion 23 extending through the backing plate for reception of the hydraulic fluid in actuation of the vehicle brakes. The protrusion 23 also serves as a means of preventing rotation of the wheel cylinder 17 when the bolt 13 is fastened to the embossment 12 of the steering knuckle 24.

Figures 3, 4, 5:
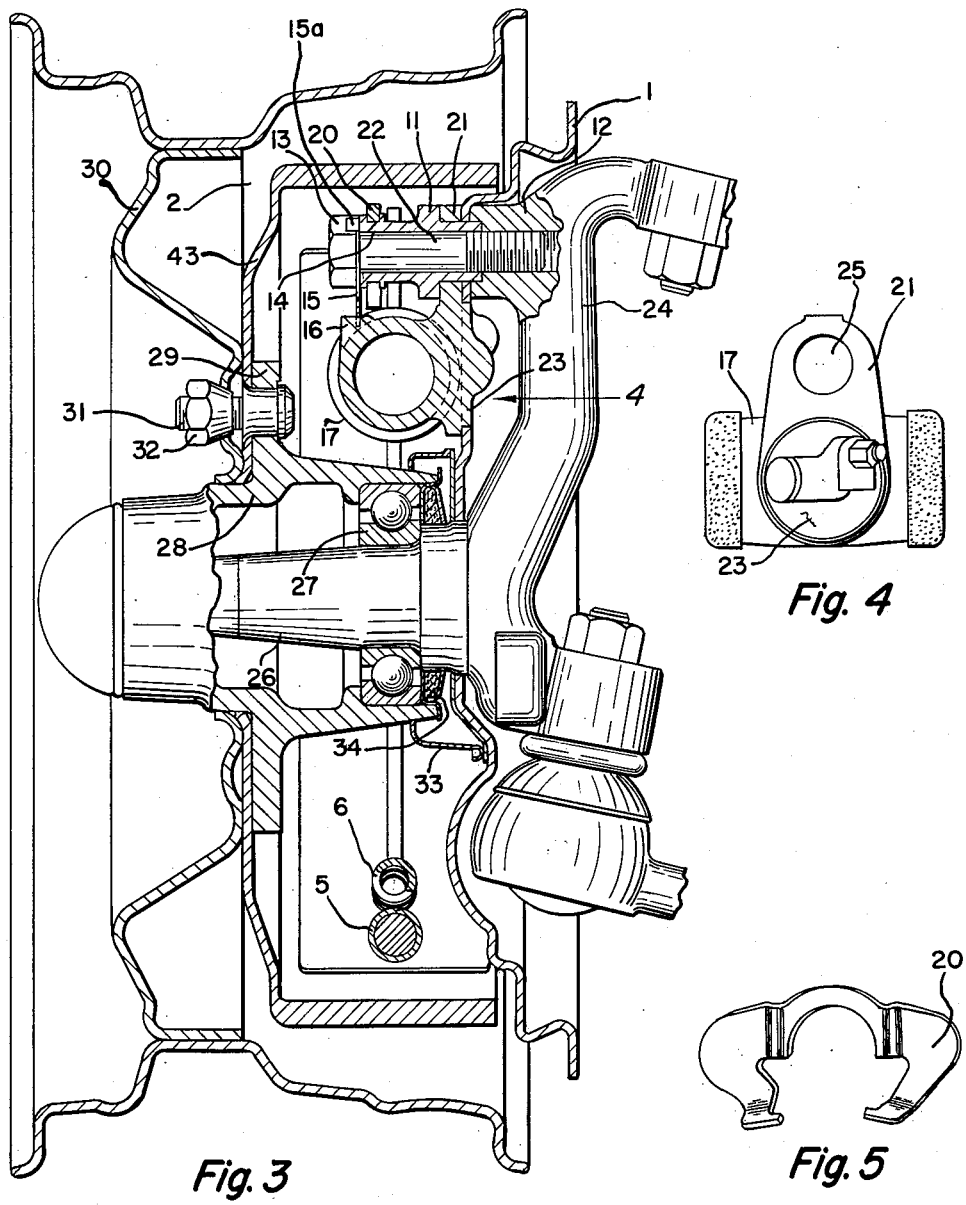
FIGURE 3 is a cross section view taken on line 3—3 showing the relative positions of the various parts of the brake relative to the steering knuckle.
FIGURE 4 is a fragmentary view taken in the direction of arrow 4 in FIGURE 3.
FIGURE 5 is a three-dimensional view of the spring anchor plate which is mounted on the anchor pin.

FIGURE 4 illustrates a view showing the protrusions 23 containing the passage means for the hydraulic fluid and an air venting valve. The tangential flange 21 is also shown with a perforation 25.

FIGURE 3 also illustrates the relative positions of the various brake parts relative to the steering knuckle 24. The steering knuckle 24 also has an axially extending spindle 26 for mounting of a bearing assembly 27. The bearing assembly 27 provides a rotatable mounting for the hub 28. The hub 28 has a radial flange 29 for fastening of the wheel 30. The wheel 30 is fastened by a plurality of bolts 31 and nuts 32. The brake drum 2 is fastened to the radial flange 43 which is also supported on the radial flange 29 of the hub. The backing plate 1 is mounted against the embossment 12 and abutting an enlarged portion of the spindle 26. The spindle 26 also carries a grease cup 33 and a seal 34 adjacent to the bearing assembly 27.

FIGURE 3 illutrates the wheel cylinder 17 having a tangential extending flange 21 abutting the backing plate 1. The hollow anchor pin 11 has an intermediate portion forming a radial flange setting on the outboard side of the tangential flange 21 to provide a rigid assembly. The cooperative adjacent ends of the brake shoes 3 and 4 are biased to a contacting position on the hollow anchor pin.

The retraction springs 18 and 19 are fastened to the ears on the anchor plate 20. The bolt 13 threadedly engages the inner periphery of an opening on an embossment of the steering knuckle 24 and is rotated until all the parts of the anchor assembly are rigidly fastened to the steering knuckle. The tabs 15a of washer 15 are then bent to retain the bolt 13 in a non-rotative position.

Figure 6:
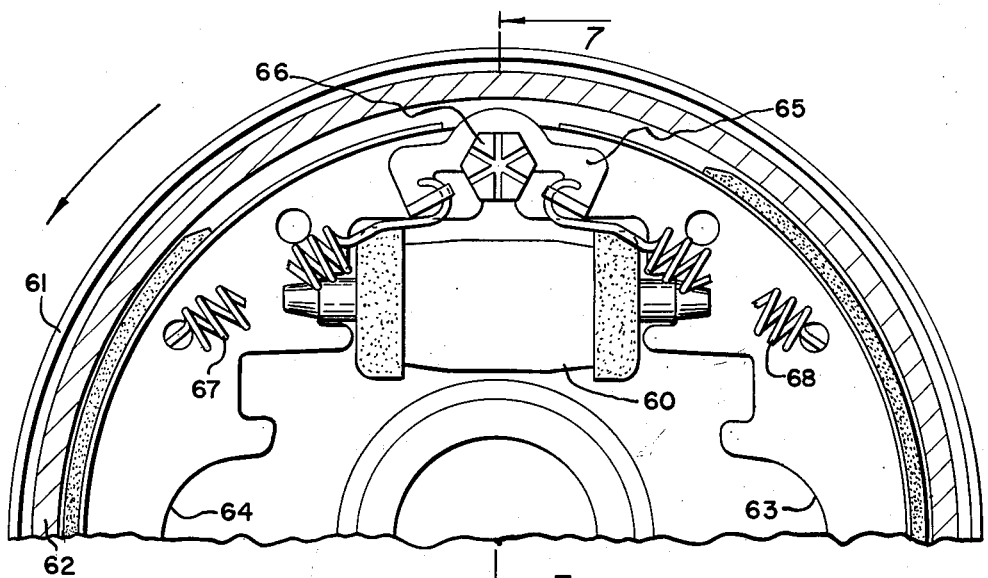
FIGURE 6 is a view of a modification of this invention wherein a wheel cylinder is mounted separately on the backing plate from the anchor pin.

FIGURE 6 illustrates a modification of the vehicle drum brake. A wheel cylinder 60 is mounted in the backing plate 61. The backing plate 61 is mounted adjacent to the rotating brake drum 62. The brake shoes 63 and 64 are mounted for frictional engagement with the inner periphery of the brake drum 62. The anchor plate 65 is mounted on the anchor pin 72 which is fastened by the bolt 66. The anchor plate 65 has a pair of ears for engagement of the retraction springs 67 and 68. The opposite ends of the retraction springs 67 and 68 engage their respective shoes 64 and 63. The steering knuckle 70 is provided with an embossment 71 having an opening 74 for the reception of the bolt 66 which is inserted through the center opening in the anchor pin 72. The backing plate 73 is fastened between the hollow anchor pin 72 and the embossment 71 on the steering knuckle 70. The steering knuckle 70 is provided with an axially extending spindle 75 to provide a mounting for the bearing assembly 76. The bearing assembly 76 forms a rotatable mount for the hub 77. The hub 77 has a radial flange 78 for mounting of the wheel 79. The hydraulic wheel cylinder 60 is fastened to the backing plate by a bolt 81. Embossment 83 extends through an opening in the backing plate 73. The modification illustrates another means for mounting of the wheel cylinder. The wheel cylinder 60 is fastened to the backing plate and is held in a non-rotative position by the embossment 83.

Figures 7, 8, 9:
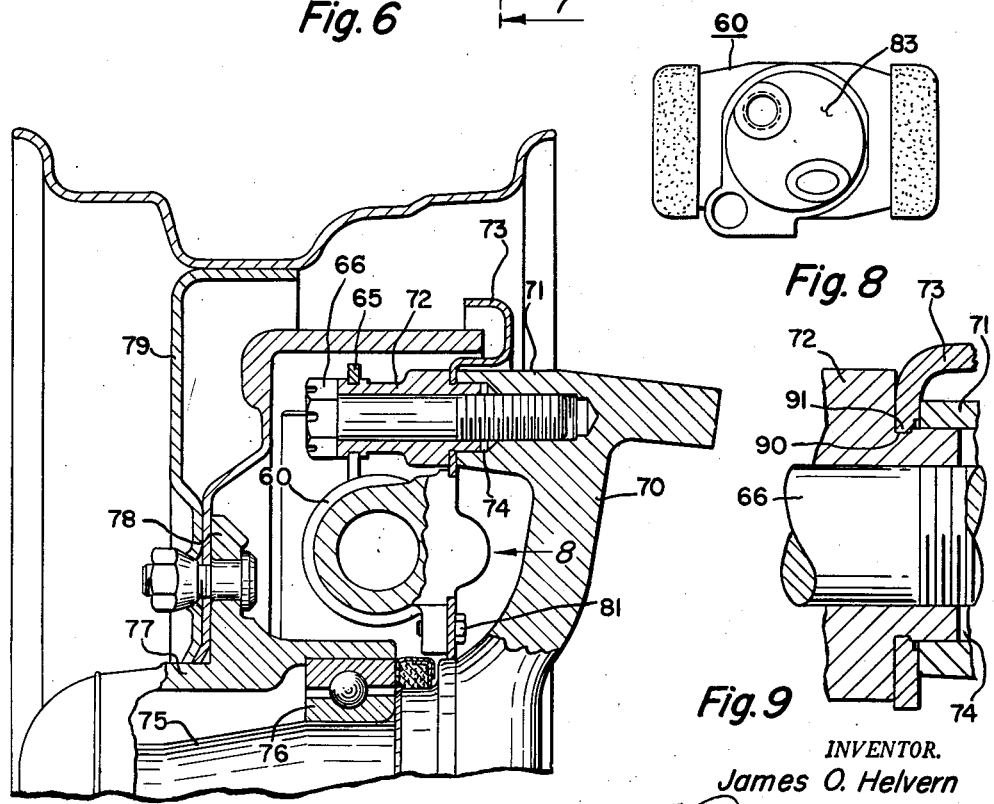
FIGURE 7 is a cross sectional view taken on line 7—7 of FIGURE 6.
FIGURE 8 is a fragmentary view taken in the direction as indicated by the arrow 8.
FIGURE 9 is an enlarged view showing the staking of the hollow anchor pin to the backing plate.

The vehicle drum brake as illustrated in FIGURES 1 and 3 includes the steering knuckle 24, which provides a mounting means for the brake assembly. The hollow anchor pin 11 is staked to the backing plate 1 as illustrated in FIGURE 9. The brake shoes 3 and 4 are assembled with the adjustable strut 5 and the spring 6. The opposite ends of the brake shoes 3 and 4 are seated on the hollow anchor pin 11 and are received by the push rods at the hydraulic wheel cylinder. The retraction springs 18 and 19 are resiliently connected to the respective brake shoes 3 and 4 and also connected to the ears on the anchor plate 20 to complete the subassembly of these braking parts.

The subassembly is then placed on the steering knuckle and fastened by means of the bolt 13 which threadedly engages the embossment 12 on the steering knuckle 24. The vehicle drum brake may be assembled or disassembled in a similar manner, thereby providing a convenient manner for repairing of the vehicle brake if necessary.

The subassembly of the brake parts may also be shipped as a unit which provides a savings in time and money in assembly of an automobile.

While the embodiments of the invention as herein disclosed constitute preferred forms, it is to be understood that other forms might be adopted.

What is claimed is as follows:

1. A vehicle drum brake comprising, in combination, a support member, an embossment on said support member for fastening a vehicle brake, a spindle on said support member for rotatably supporting a vehicle wheel, a brake drum and wheel mounted concentrically on said steering spindle, a backing plate mounted concentrically with said spindle and abutting a planar surface on said embossment of said support member, a hydraulic wheel cylinder having a tangential flange with a perforation, a pair of brake shoes mounted within said brake drum for engagement with the inner periphery of said drum, an adjustable strut positioned between two of the cooperative adjacent ends of said brake shoes, said hydraulic wheel cylinder positioned between the opposite two cooperative adjacent ends of said brake shoes, a hollow anchor pin anchoring said brake shoes, a portion of said anchor pin extending through said backing plate and said perforation of said hydraulic wheel cylinder, fastening means extending through said hollow anchor pin and engaging an opening in said embossment of said support member thereby fastening said brake assembly on said support member.

2. A vehicle drum brake comprising in combination, a steering knuckle including, an embossment with a planar surface, a spindle rotatably supporting a vehicle wheel, a backing plate concentrically mounted on said spindle of said steering knuckle and abutting said planar surface on said embossment, a brake drum rotatably mounted on said spindle, a pair of brake shoes engaging the inner periphery of said rotating brake drum, an adjustable strut positioned between two of the cooperative adjacent ends of said brake shoes, a hydraulic wheel cylinder positioned between the opposite two cooperative adjacent ends of said brake shoes, said hydraulic wheel cylinder having a protrusion extending through an opening in said backing plate, a tangentially extending flange on said wheel cylinder mounted adjacent to said backing plate on the side opposite of the side engaging said planar surface on said embossment, a hollow anchor pin, a portion of said anchor pin extending through a perforation on said tangentially extending flange of said wheel cylinder and a perforation in said backing plate to engage said embossment, a fastening means extending through the central opening in said hollow anchor pin to thereby provide a fastening means for said hollow anchor pin, said hydraulic wheel cylinder and said backing plate.

3. A vehicle drum brake comprising in combination, a support member, a backing plate mounted on said support member, a rotating brake drum mounted adjacent to said backing plate, a pair of brake shoes for frictionally engaging the inner periphery of said rotating brake drum, a strut positioned between two cooperative adjacent ends of said brake shoes, a hydraulic wheel cylinder positioned between the opposite two cooperative adjacent ends of said brake shoes, said backing plate having an opening receiving a protrusion on said hydraulic wheel cylinder, a tangential flange extending from said hydraulic wheel cylinder upwardly adjacent to said backing plate, said tangential flange having a perforation receiving an anchor means, a hollow anchor pin mounted within said perforation of said tangential flange of said hydraulic wheel cylinder and a second opening in said backing plate, a shoulder portion on said anchor pin abutting said tangential flange of said hydraulic wheel cylinder and maintaining the relative position of said anchor pin, said wheel cylinder, and said backing plate, an annular recess about the intermediate portion of said hollow anchor pin receiving the opposite two cooperative adjacent ends of said brake shoes when said shoes are in the retracted position, an anchor plate, a second annular recess on said hollow anchor pin on the axial outboard end of said pin receiving said anchor plate, retraction springs for said brake shoes, said anchor plate forming means for engaging said retraction springs and a bolt member extending through the hollow portion of said hollow anchor pin and threadedly engaging said support member to thereby provide a fastening means for the wheel cylinder, the anchor pin, and the backing plate.

4. A vehicle drum brake comprising in combination, a support member, a backing plate mounted on said support member, a rotating brake drum mounted adjacent to said backing plate, a pair of brake shoes frictionally engaging the inner periphery of said rotating brake drum, a strut positioned between two cooperative adjacent ends of said brake shoes, a hydraulic cylinder positioned between the opposite two cooperative adjacent ends of said brake shoes, said backing plate having an opening, an embossment on said hydraulic wheel cylinder received in said opening, means fastening said hydraulic wheel cylinder to said backing plate, a hollow anchor pin, a second opening in said backing plate receiving said hollow anchor pin, a shoulder portion on said hollow anchor pin abutting the backing plate adjacent the outer periphery of said second opening in said backing plate, an annular recess about the intermediate portion of said hollow anchor pin receiving the opposite two cooperative adjacent ends of said brake shoes in the retracted position, an anchor plate, a second annular recess about the outboard end of said hollow anchor pin receiving said anchor plate, two laterally extending ears on said anchor plate engaging the retraction means for each of the two brake shoes, a bolt member received within the hollow portion of said hollow anchor pin and threadedly engaging said support member to thereby provide a unitary fastening means for said hollow anchor pin and said backing plate.

5. A vehicle drum brake, comprising, in combination, a support member, means on said support member rotatably supporting a brake drum and vehicle wheel, an embossment on said support member supporting a subassembly including a backing plate, a wheel cylinder, means connecting said wheel cylinder to said backing plate, two brake shoes adapted for frictionally engaging the inner periphery of said brake drum, a strut positioned between two cooperative adjacent ends of said brake shoes, said wheel cylinder positioned between the opposite two cooperative adjacent ends of said brake shoes, a hollow anchor pin engaging said brake shoes in their retracted position, a portion of said hollow anchor pin extending through an opening in said backing plate and adapted for engaging said embossment on said support member, a retraction means retracting said brake shoes, fastening means extending through the central opening in said hollow anchor pin adapted for threadedly engaging said embossment on said support member thereby providing the fastening means for said subassembly.

References Cited in the file of this patent

UNITED STATES PATENTS

| | | |
|---|---|---|
| 1,222,929 | Campbell | Apr. 17, 1917 |
| 2,764,266 | Haworth | Sept. 25, 1956 |
| 2,885,035 | Rubly | May 5, 1959 |

FOREIGN PATENTS

| | | |
|---|---|---|
| 723,488 | Great Britain | Feb. 9, 1955 |